(12) United States Patent
Ban

(10) Patent No.: US 12,106,594 B2
(45) Date of Patent: Oct. 1, 2024

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Masashi Ban, Kanagawa (JP)

(73) Assignee: FUJIFILM BUSINESS INNOVATION CORP., Tokyo (JP)

(*) Notice: Subject to any disclaimer, the term of this patent is extended or adjusted under 35 U.S.C. 154(b) by 495 days.

(21) Appl. No.: 17/336,963

(22) Filed: Jun. 2, 2021

(65) Prior Publication Data

US 2022/0198184 A1    Jun. 23, 2022

(30) Foreign Application Priority Data

Dec. 18, 2020 (JP) .................................. 2020-210544

(51) Int. Cl.
*G06V 30/412* (2022.01)
*G06V 10/98* (2022.01)
*G06V 30/10* (2022.01)

(52) U.S. Cl.
CPC .......... *G06V 30/412* (2022.01); *G06V 10/987* (2022.01); *G06V 30/10* (2022.01)

(58) Field of Classification Search
CPC .... G06V 10/987; G06V 10/98; G06V 10/993; G06V 30/10; G06V 30/153; G06V 30/127; G06F 3/04883; G06F 3/0484; G06F 16/93; G06F 40/174
See application file for complete search history.

(56) References Cited

U.S. PATENT DOCUMENTS

| | | | | |
|---|---|---|---|---|
| 5,717,794 A | * | 2/1998 | Koga | G06V 10/987 382/229 |
| 5,933,531 A | * | 8/1999 | Lorie | G06V 30/268 382/229 |
| 6,587,572 B1 | * | 7/2003 | Suchenwirth-Bauersachs | G06V 10/987 382/101 |
| 6,741,724 B1 | * | 5/2004 | Bruce | G06F 40/232 382/310 |
| 8,214,430 B2 | | 7/2012 | Murakami et al. | |
| 8,331,739 B1 | * | 12/2012 | Abdulkader | G06V 30/248 358/1.11 |
| 11,093,774 B2 | * | 8/2021 | Beller | G06V 30/416 |
| 11,093,775 B2 | * | 8/2021 | Nishioka | G06F 40/174 |

(Continued)

FOREIGN PATENT DOCUMENTS

| | | | |
|---|---|---|---|
| JP | H9-34948 A | 2/1997 | |
| JP | 2007-72565 A | 3/2007 | |
| JP | 2020177426 A | * 10/2020 | ......... G06K 9/00442 |

OTHER PUBLICATIONS

R. G. Casey and D. R. Ferguson, "Intelligent Forms Processing," in IBM Systems Journal, vol. 29, No. 3, pp. 435-450, 1990, doi:10.1147/sj.293.0435. (Year: 1990).*

*Primary Examiner* — Michael Robert Cammarata
(74) *Attorney, Agent, or Firm* — Oliff PLC

(57) ABSTRACT

An information processing apparatus includes a processor configured to receive, if an error is found in sorting of a form image after an operator checks and corrects a result of character recognition performed on the sorted form image, an instruction to cause a process to revert to the sorting for the form image.

11 Claims, 11 Drawing Sheets

(56) References Cited

U.S. PATENT DOCUMENTS

| | | | | |
|---|---|---|---|---|
| 11,615,789 | B2* | 3/2023 | Kosik | G06F 3/017 |
| | | | | 704/251 |
| 2006/0093220 | A1* | 5/2006 | Chevion | G06F 40/174 |
| | | | | 715/224 |
| 2009/0274369 | A1* | 11/2009 | Sano | G06V 10/987 |
| | | | | 707/999.1 |
| 2010/0246999 | A1* | 9/2010 | Tillberg | G06Q 10/10 |
| | | | | 382/309 |
| 2011/0280481 | A1* | 11/2011 | Radakovic | G06V 10/987 |
| | | | | 382/311 |
| 2012/0148105 | A1* | 6/2012 | Burry | G08G 1/0175 |
| | | | | 382/105 |
| 2017/0109594 | A1* | 4/2017 | Sahagun | G06F 3/0481 |
| 2017/0124390 | A1* | 5/2017 | Koyanagi | G06V 30/1448 |
| 2019/0026579 | A1* | 1/2019 | Hall | G06V 30/2253 |
| 2020/0327373 | A1* | 10/2020 | Tecuci | G06F 40/284 |
| 2020/0402503 | A1* | 12/2020 | Iwanari | G10L 15/26 |
| 2021/0090559 | A1* | 3/2021 | Kosik | G06F 1/3206 |
| 2021/0124919 | A1* | 4/2021 | Balakrishnan | B42D 25/309 |

* cited by examiner

FIG. 4

| JOB NAME | DETAILS | STATUS | REGISTRATION TIME | No. OF PAGES BEING CHECKED | No. OF PAGES TO BE OUTPUT | No. OF PAGES (BEING) OUTPUT |
|---|---|---|---|---|---|---|
| 2020_001 | | WAITING FOR OCR CHECK AND CORRECTION | 10/01/2020 10:56 | 10 | 10 | 0 |
| 2020_002 | | WAITING FOR OCR CHECK AND CORRECTION | 10/01/2020 10:56 | 15 | 15 | 10 |
| 2020_003 | | WAITING FOR OUTPUT | 10/01/2020 10:56 | 0 | 50 | 40 |
| 2020_004 | | WAITING FOR OUTPUT | 10/01/2020 10:56 | 0 | 15 | 5 |
| ... | | | | | | |

REVERSION INSTRUCTION SELECTION SCREEN — 41

STANDARD FORM – 1p, 10 COPIES – 06: xxxyyyzzz

42

REVERSION TO CHARACTER RECOGNITION FOR INCOMPLETE FORM
PROCESS WILL REVERT SINCE FOLLOWING RECORD IS INCOMPLETE FORM.
JOB NAME: ZZZ001
RECORD ID: 00020
OPERATOR: A. FUJI
COMMENT (REQUIRED)
I've checked the record.
The form is incomplete because a future application date is used. The process will revert.

CANCEL   OK

45

43

| ACTION ▼ |
|---|
| (a) REGISTER |
| (b) REVERT TO CHARACTER RECOGNITION |
| (c) REVERT TO SORTING |
| (d) DELETE |
| INPUT COMMENT |

SPECIFY RECORD ▶   NEXT RECORD   KEEP   CANCEL   OK

FIG. 9

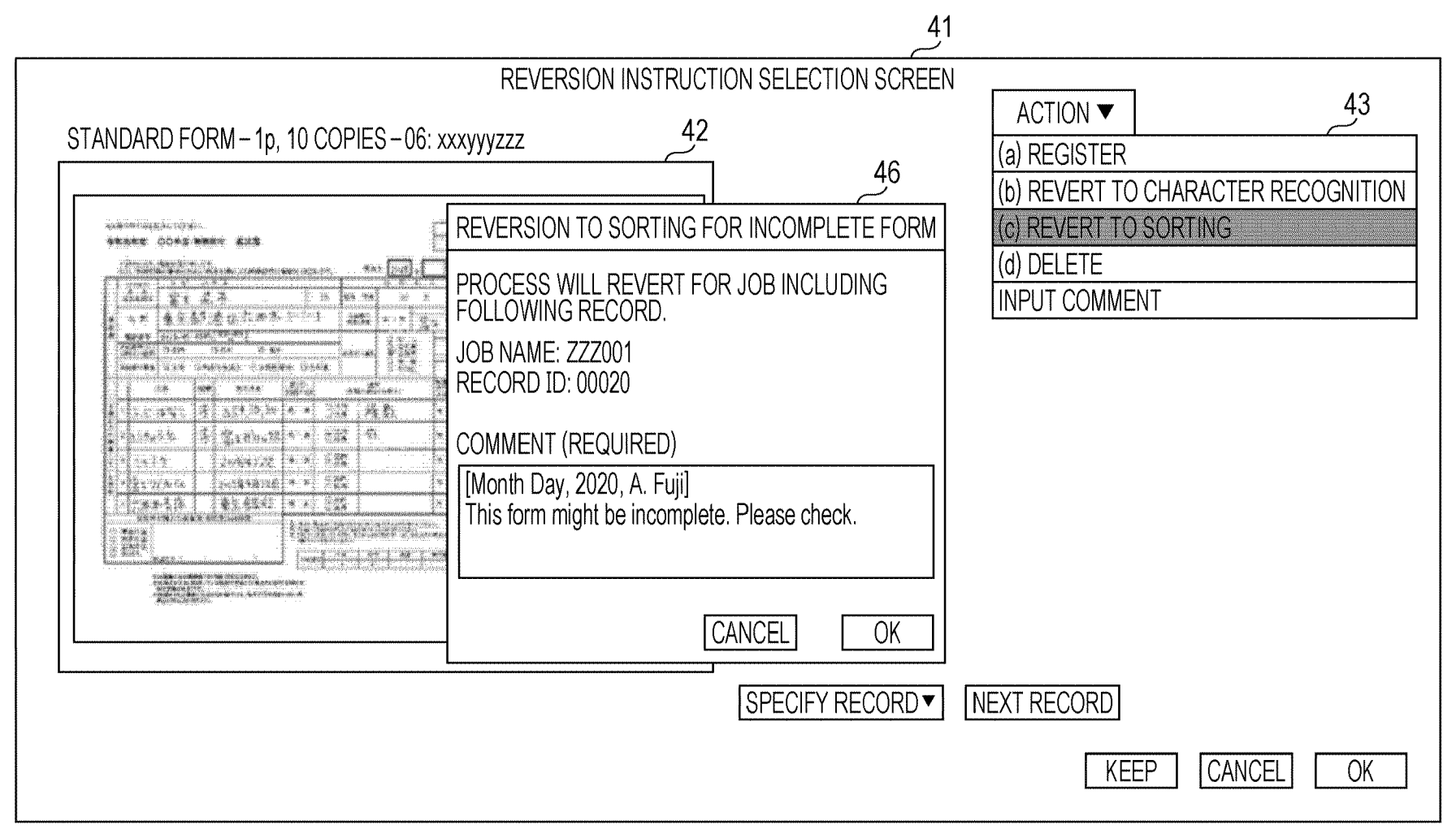

REVERSION INSTRUCTION SELECTION SCREEN — 41

STANDARD FORM – 1p, 10 COPIES – 06: xxxyyyzzz

ACTION ▼ — 43
(a) REGISTER
(b) REVERT TO CHARACTER RECOGNITION
(c) REVERT TO SORTING
(d) DELETE
INPUT COMMENT

42

REVERSION TO SORTING FOR INCOMPLETE FORM — 46

PROCESS WILL REVERT FOR JOB INCLUDING FOLLOWING RECORD.

JOB NAME: ZZZ001
RECORD ID: 00020

COMMENT (REQUIRED)
[Month Day, 2020, A. Fuji]
This form might be incomplete. Please check.

CANCEL  OK

SPECIFY RECORD ▶  NEXT RECORD  KEEP  CANCEL  OK

FIG. 12

OCR CHECK AND CORRECTION SCREEN — 48

[PREVIOUS RECORD] [NEXT RECORD] [OPERATION CHECK] [ACTION ▼]

2/49 RECORDS (1 RECORD CHECKED) | SCAN IMAGE/RECOGNITION RESULT | CHARACTER SIZE [S][M][L] CONFIDENCE CHECK ☐ ▼

52

| ITEM NAME ▼ | |
|---|---|
| DELIVERY DATE [!] | 07/08/2020 ☐ (H) <br> [DELIVERY DATE] IS NOT LATER THAN 5 DAYS FROM TODAY. |
| REGISTRATION CONDITION [!] | ☑ NEW ☐ (H) <br> [REGISTRATION CONDITION] IS [NEW], BUT THERE IS NO DATA IN [ADDRESS]. |
| ADDRESS [!] | ☐ (H) <br> [REGISTRATION CONDITION] IS [NEW], BUT THERE IS NO DATA IN [ADDRESS]. |

10 CHECKED    45 REMAINING

RECEIPT – 08142020:0005

49

1/2 < > ⊖ ⊕ [FIT TO SCREEN]

[KEEP]    [CANCEL]    [OK]

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-210544 filed Dec. 18, 2020.

BACKGROUND

(i) Technical Field

The present disclosure relates to an information processing apparatus and a non-transitory computer readable medium.

(ii) Related Art

In Japanese Unexamined Patent Application Publication No. 2007-72565, for example, a network image processing system is described that includes plural apparatuses connected to one another over a network, each of the plural apparatuses carrying out an action, which is processing performed on a document to be processed, by communicating the document. Each of the plural apparatuses includes display means for displaying documents for each action as a list, reception means for receiving selection of a document by a user from the list of documents, and reversion means for causing an operation stage to revert to an apparatus that has carried out an action corresponding to the selected document.

In Japanese Unexamined Patent Application Publication No. 9-34948, a method for returning an electronic document to be used in a workflow system for achieving a series of operations by sequentially transferring an electronic document including plural information items to different operator terminals in accordance with predetermined transfer order is described. In the method, identification information regarding a responsible person is registered to a responsibility table in advance for each of the information items included in the electronic document. If an operation to be performed again and an information item for which the operation is to be performed are selected using one of the operator terminals, identification information regarding a responsible person corresponding to the information item is found on the responsibility table, and the electronic document is returned to an operator terminal used by the responsible person identified from the found identification information.

SUMMARY

A form operation system performs a form operation through a process including, for example, sorting of form images, a check and correction of a result of the sorting by an operator, character recognition of the sorted form images, a check and correction of a result of the character recognition by an operator, and outputting of the result of the character recognition.

If there is an error in sorting of forms after an operator checks and corrects a result of character recognition, input form images need to be deleted, and the forms need to be read again, which is troublesome for the operator.

Aspects of non-limiting embodiments of the present disclosure relate to an information processing apparatus and a non-transitory computer readable medium capable of, if an error is found in sorting of form images after the form images are sorted and an operator checks and corrects a result of character recognition performed on the sorted form images, reducing time taken to cause a process to revert compared to when forms are read again.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to receive, if an error is found in sorting of a form image after an operator checks and corrects a result of character recognition performed on the sorted form image, an instruction to cause a process to revert to the sorting for the form image.

BRIEF DESCRIPTION OF THE DRAWINGS

An exemplary embodiment of the present disclosure will be described in detail based on the following figures, wherein:

FIG. 4 is a diagram illustrating an example of a status management table according to the exemplary embodiment;

FIG. 8 is a diagram illustrating another example of the reversion instruction selection screen according to the exemplary embodiment;

FIG. 9 is a diagram illustrating yet another example of the reversion instruction selection screen according to the exemplary embodiment;

FIG. 12 is a diagram illustrating another example of the OCR check and correction screen according to the exemplary embodiment.

DETAILED DESCRIPTION

Figure 1:
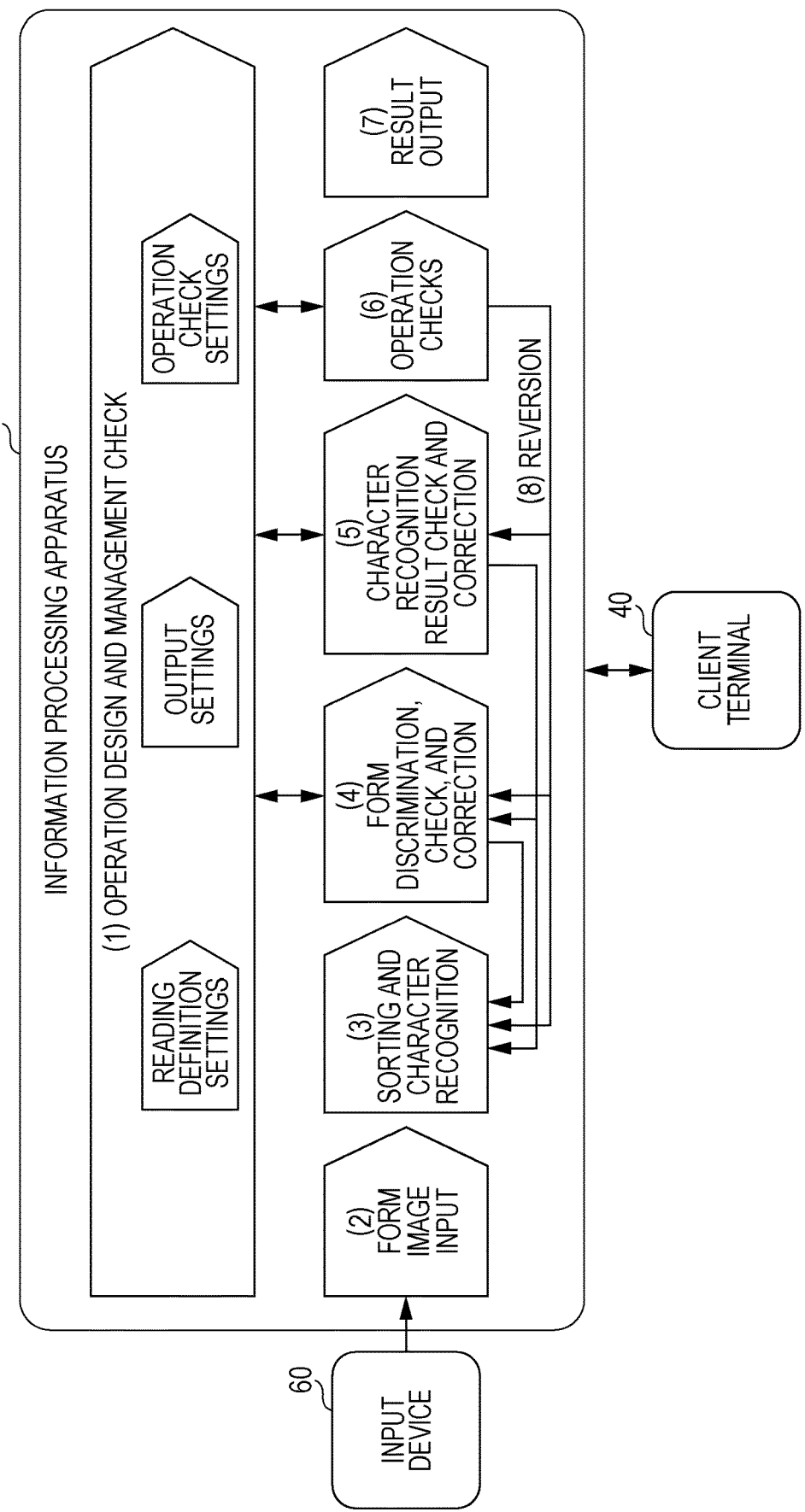
FIG. 1 is a diagram illustrating the schematic configuration of a form system according to an exemplary embodiment.

An exemplary embodiment for implementing techniques in the present disclosure will be described in detail hereinafter with reference to the drawings. Components and steps that achieve the same operations, effects, or functions are given the same reference numerals throughout the drawings, and redundant description thereof might be omitted as necessary. The drawings are only specific enough to facilitate understanding of the techniques in the present disclosure. The techniques in the present disclosure, therefore, are not limited to examples illustrated in the drawings. In the exemplary embodiment, description of known components and components that are not directly related to the present disclosure might be omitted.

FIG. 1 is a diagram illustrating the schematic configuration of a form system 10 according to the present exemplary embodiment.

As illustrated in FIG. 1, the form system 10 includes an information processing apparatus 20, a client terminal 40, and an input device 60. These apparatuses are connected to a network, which is not illustrated, and communicate with one another over the network. The network is, for example, the Internet, a local area network (LAN), or a wide-area network (WAN).

The information processing apparatus 20 manages a process where OCR is performed on image data regarding documents including forms (hereinafter referred to as "form images") input through an input device 60 and a result of the OCR is output to a predetermined destination. Not only characters and numbers but also various symbols, marks, and the like are recognized in the OCR. The information processing apparatus 20 is, for example, a server computer or a general-purpose computer such as a personal computer (PC). A specific configuration of, and an effect produced by, the information processing apparatus 20 will be described later.

The client terminal 40 transmits various instructions relating to OCR to the information processing apparatus 20. The various instructions include, for example, an instruction to start OCR on form images and an instruction to display a result of character recognition obtained as a result of OCR performed on form images. The client terminal 40 also displays various pieces of information such as a result of OCR performed by the information processing apparatus 20 in accordance with various instructions that have been received and notifications about the OCR. The client terminal 40 is, for example, a server computer or a general-purpose computer such as a PC. Although FIG. 1 illustrates only one client terminal 40, plural client terminals 40 may be prepared, instead, and used for different processes.

The input device 60 inputs form images to be subjected to OCR to the information processing apparatus 20. The input device 60 is, for example, a server computer, a general-purpose computer such as a PC, or an image forming apparatus having a scanning function, a printing function, and a facsimile function. In addition to the input device 60, the client terminal 40 may also be able to input form images to the information processing apparatus 20.

Next, an outline of the form system 10 will be described. In the form system 10, the information processing apparatus 20 performs OCR on form images input through the input device 60 and outputs a result of the OCR to a predetermined destination.

In the OCR, the information processing apparatus 20 manages various types of processing including (1) operation design and management check, (2) form image input, (3) sorting and character recognition, (4) form discrimination, check, and correction, (5) character recognition result check and correction, (6) operation checks, (7) result output, and (8) reversion. In the present exemplary embodiment, the OCR includes not only a recognition of characters, symbols, and the like from form images but also post-processing such as correction of the characters.

In an example of the management of the various types of processing, the information processing apparatus 20 automatically performs (1) operation design and management check, (2) form image input, (3) sorting and character recognition, (6) operation checks, and (7) result output. As for (4) form discrimination, check, and correction and (5) character recognition result check and correction, an operator makes inputs using the client terminal 40. The information processing apparatus 20 may automatically perform (8) reversion, or a manager or the operator may make inputs for (8) reversion using the client terminal 40.

In (1) operation design and management check, job rules including reading definition settings (also referred to as "character recognition definition settings"), output settings, and operation check settings are created. In the reading definition settings, for example, character recognition areas, in which form images are to be read in (3) sorting and character recognition, are set. More specifically, for example, a definition is set such that item values, which are values to be read, will be read from rightward areas of items to be extracted as keys. In the output settings, for example, a file format of data output in (7) result output and a destination are set. In the operation check settings, for example, a format including required input items and the number of characters that can be input in forms to be detected in (6) operation checks is set.

In (2) form image input, form images are input from the input device 60. The form images are registered as a job, which is a unit for which (3) sorting and character recognition is to be performed.

In (3) sorting and character recognition, the form images in the job are sorted using some of the job rules selected by a user for the job, the job rules having been created in (1) operation design and management check. More specifically, correspondences between the form image and pages of the forms are automatically identified and the form images are sorted as, for example, form A, form B, and the like. Character recognition is then performed on the form images in the job on the basis of a result of the sorting. That is, if a form image is sorted as form A, for example, information is extracted as form A. If there is an error in sorting, therefore, information might not be correctly extracted. If order of sorted form images is incorrect when a form includes plural pages, information might become inconsistent. The sorting in this process is also called "form discrimination".

In (4) form discrimination, check, and correction, the form images in the job are divided into records indicating the form included in the job on the basis of a result of the form discrimination performed in (3) sorting and character recognition. The records are then displayed in this process, and the operator checks and corrects the result of form discrimination.

In (5) character recognition result check and correction, a result of the recognition of characters and symbols in the character recognition areas performed in (3) sorting and character recognition is displayed, and an operator checks and corrects the result of the recognition. The operator may be the one who performs (4) form discrimination, check, and correction, or may be another person.

In (6) operation checks, an error in the preceding processing is detected on the basis of the operation check settings included in some of the job rules selected by the operator for the job, the job rules having been created in (1)

operation design and management check. A result of the detection may be presented to the manager or the operator.

In (7) result output, data indicating a result of the OCR is created and output to a predetermined destination using the output settings included in some of the job rules selected by the user for the job, the job rules having been created in (1) operation design and management check.

In (8) reversion, a process reverts from a type of processing performed the OCR to another type of processing one or more steps before. For example, the operator requests reversion using the client terminal 40 during (3) sorting and character recognition, (4) form discrimination, check, and correction, (5) character recognition result check and correction, or the like. Alternatively, for example, the manager requests reversion using his/her client terminal 40 in accordance with a result of a check conducted by the manager between (6) operation checks and (7) result output.

The reversion includes deletion of form images and resumption of processing or restoration of form images to a state in a preceding step. That is, the reversion is not limited to reversion for form images and includes reversion for processing (steps).

In the OCR, (1) operation design and management check is performed before (3) sorting and character recognition and the later processing are performed, that is, before the form system 10 is operated. Alternatively, (1) operation design and management check may be performed while (3) sorting and character recognition and the later processing are being performed, that is, while the form system 10 is being operated. For example, the job rules created in (1) operation design and management check before the form system 10 is operated may be corrected in accordance with a result of (5) character recognition result check and correction, which is performed while the form system 10 is being operated.

Figure 2:
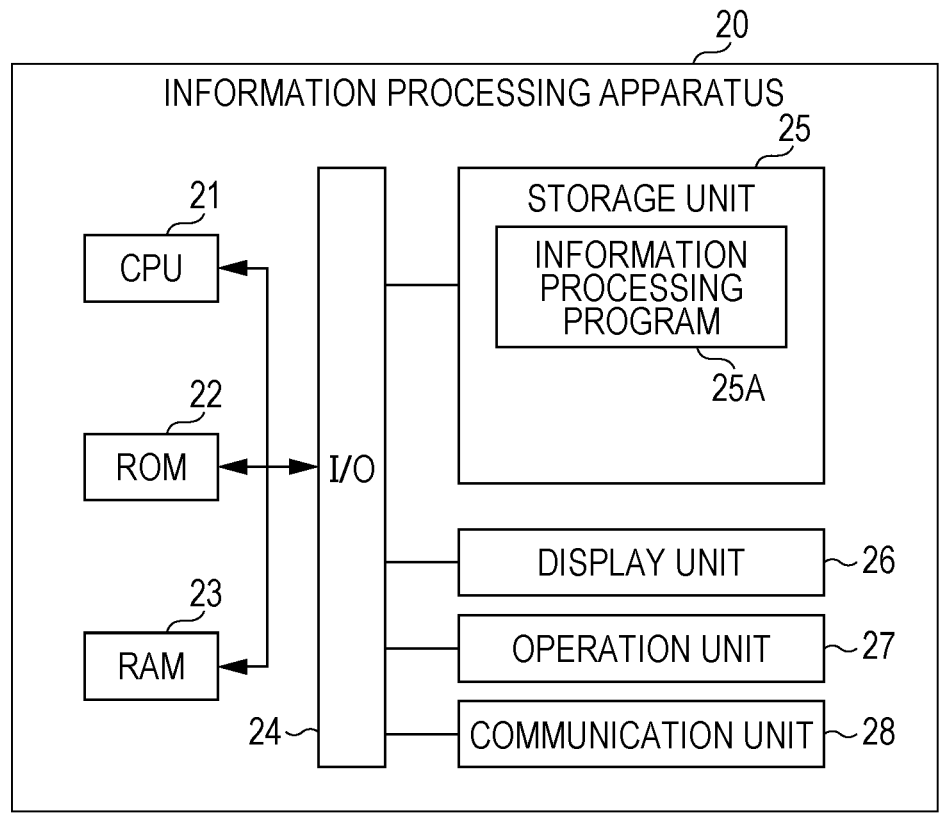
FIG. 2 is a block diagram illustrating an example of the electrical configuration of an information processing apparatus according to the exemplary embodiment.

FIG. 2 is a block diagram illustrating an example of the electrical configuration of the information processing apparatus 20 according to the present exemplary embodiment.

As illustrated in FIG. 2, the information processing apparatus 20 according to the present exemplary embodiment includes a central processing unit (CPU) 21, a read-only memory (ROM) 22, a random-access memory (RAM) 23, an input/output interface (I/O) 24, a storage unit 25, a display unit 26, an operation unit 27, and a communication unit 28.

The CPU 21, the ROM 22, the RAM 23, and the I/O 24 are connected to one another through a bus. Functional units including the storage unit 25, the display unit 26, the operation unit 27, and the communication unit 28 are connected to the I/O 24. These functional units are communicably connected to the CPU 21 through the I/O 24.

The CPU 21, the ROM 22, the RAM 23, and the I/O 24 together achieve a control unit. The control unit may be achieved as a sub-control unit that controls a part of the information processing apparatus 20 or may be achieved as a control unit that controls the entirety of the information processing apparatus 20. An integrated circuit (IC) such as a large-scale integration (LSI) circuit or an IC chipset, for example, is used for a part or the entirety of each of blocks of the control unit. Independent circuits may be used for different blocks, or a circuit on which some or all of the blocks are integrated together may be used. The blocks may be integrated with one another, or some blocks may be separately provided. In each of the blocks, a part of the block may be separately provided. The control unit need not be integrated using an LSI circuit, and a dedicated circuit or a general-purpose processor may be used, instead.

A hard disk drive (HDD), a solid-state drive (SSD), or a flash memory, for example, is used as the storage unit 25. The storage unit 25 stores an information processing program 25A for achieving a form operation according to the present exemplary embodiment. The information processing program 25A may be stored in the ROM 22, instead.

Alternatively, the information processing program 25A may be installed on the information processing apparatus 20 in advance. The information processing program 25A may be stored in a nonvolatile storage medium or distributed over a network and then installed on the information processing apparatus 20 as necessary, instead. Examples of the nonvolatile storage medium include a compact disc read-only memory (CD-ROM), a magneto-optical (MO) disk, an HDD, a digital versatile disc read-only memory (DVD-ROM), a flash memory, and a memory card.

A liquid crystal display (LCD) or an organic electroluminescent (EL) display, for example, is used as the display unit 26. A touch panel may be integrated with the display unit 26. Devices for inputting operations, such as a keyboard and a mouse, are provided as the operation input unit 27. The display unit 26 and the operation unit 27 receive various instructions from the user of the information processing apparatus 20. The display unit 26 displays results of processing performed in accordance with instructions received from the user and various pieces of information such as notifications about the processing.

The communication unit 28 is connected to a network such as the Internet, a LAN, or a WAN and capable of communicating with external devices such as the client terminal 40 and the input device 60 over the network.

As described above, if there is an error in sorting of forms after the operator checks and corrects a result of character recognition, input form images need to be deleted and the forms need to be read again, which is troublesome for the operator.

If there is an error in sorting of form images after the operator checks and corrects a result of character recognition, the information processing apparatus 20 according to the present exemplary embodiment receives an instruction to cause a process to revert to the sorting for the form images.

A step to which the process reverts will be described hereinafter. The process might revert to an operator, or the manager might cause, after making appropriate settings, the process to revert to an operation to be performed again. For example, the manager might set form A for an incomplete form, and then the sorting might be automatically performed again on the basis of form A and an operator might be asked to check and correct a result of the sorting. Alternatively, the manager might notify an operator of an error in the sorting, and then the operator might cause the process to revert to the step where a result of the sorting is checked and corrected. The same holds for the character recognition.

That is, in the present exemplary embodiment, the reversion to the sorting refers to reversion to (3) sorting and character recognition or (4) form discrimination, check, and correction. Similarly, the reversion to the character recognition refers to reversion to (3) sorting and character recognition or (5) character recognition result check and correction.

Figure 3:
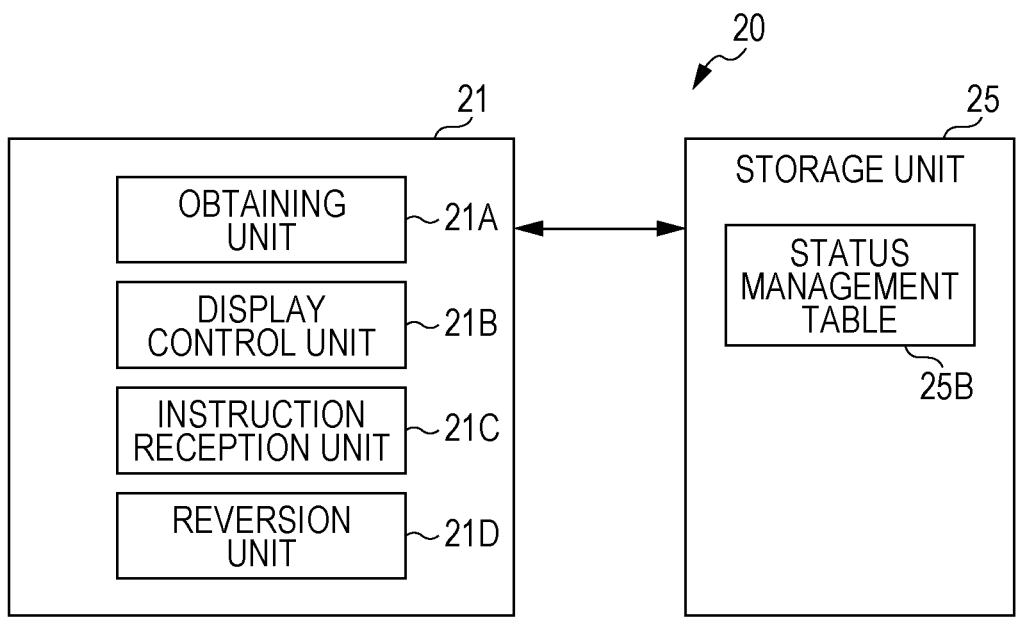
FIG. 3 is a block diagram illustrating an example of the functional configuration of the information processing apparatus according to the exemplary embodiment.

More specifically, the CPU 21 of the information processing apparatus 20 according to the present exemplary embodiment functions as components illustrated in FIG. 3 by loading the information processing program 25A stored in the storage unit 25 into the RAM 23 and executing the information processing program 25A. The CPU 21 is an example of a processor.

FIG. 3 is a block diagram illustrating an example of the functional configuration of the information processing apparatus 20 according to the present exemplary embodiment.

As illustrated in FIG. 3, the CPU 21 of the information processing apparatus 20 according to the present exemplary embodiment functions as an obtaining unit 21A, a display control unit 21B, an instruction reception unit 21C, and a reversion unit 21D.

The storage unit 25 according to the present exemplary embodiment stores, for example, a status management table 25B illustrated in FIG. 4.

FIG. 4 is a diagram illustrating an example of the status management table 25B according to the present exemplary embodiment.

The status management table 25B illustrated in FIG. 4 is a table that can be accessed by the operator using the client terminal 40. The status management table 25B manages a status indicating the progress of a form operation relating to form images. More specifically, the status management table 25B includes, for example, "job name", which indicates a name of a job to be subjected to a form operation, "details", which indicates detailed information regarding a job, "status", which indicates the progress of a job, "registration time", which indicates a time at which a job has been registered, "No. of pages being checked", which indicates pages that are being checked in a job, "No. of pages to be output", which indicates pages waiting for outputting in a job, and "No. of pages (being) output", which indicates pages that are being output or have been output in a job.

In FIG. 3, the obtaining unit 21A obtains form images and a result of character recognition, which is obtained by performing character recognition on the form images.

If there is an error in sorting of the form images after the operator checks and corrects the result of character recognition of the sorted form images, the display control unit 21B displays a reversion instruction selection screen, for example, illustrated in FIGS. 7 to 10 on the client terminal 40 used by the manager. An error in the sorting of the form images may be visually found by the manager or the operator or automatically detected in (6) operation checks. An error in the sorting of the form images is, for example, mixing of different forms, missing pages, or redundancy of pages.

The instruction reception unit 21C receives an instruction to cause the process to revert to the sorting for the form images through the reversion instruction selection screen displayed on the client terminal 40.

If the reversion unit 21D receives the instruction to cause the process to revert to the sorting, the reversion unit 21D changes the status of the status management table 25B in such a way as to indicate that the process has reverted to the sorting. Similarly, if the reversion unit 21D receives an instruction to cause the process to revert to the character recognition, the reversion unit 21D changes the status of the status management table 25B in such a way as to indicate that the process has reverted to the character recognition. The operator accesses the status management table 25B using the client terminal 40, understands that the process has reverted, and performs an operation again. Alternatively, if the reversion unit 21D receives an instruction to cause the process to revert to the sorting, the reversion unit 21D may notify a client terminal 40 used by an operator who performs the sorting that the process has reverted to the sorting. Such notification may also be performed for the character recognition. A notification method is not particularly limited, but an email, for example, may be used.

Next, the reversion according to the present exemplary embodiment will be described with reference to FIG. 5.

Figure 5:
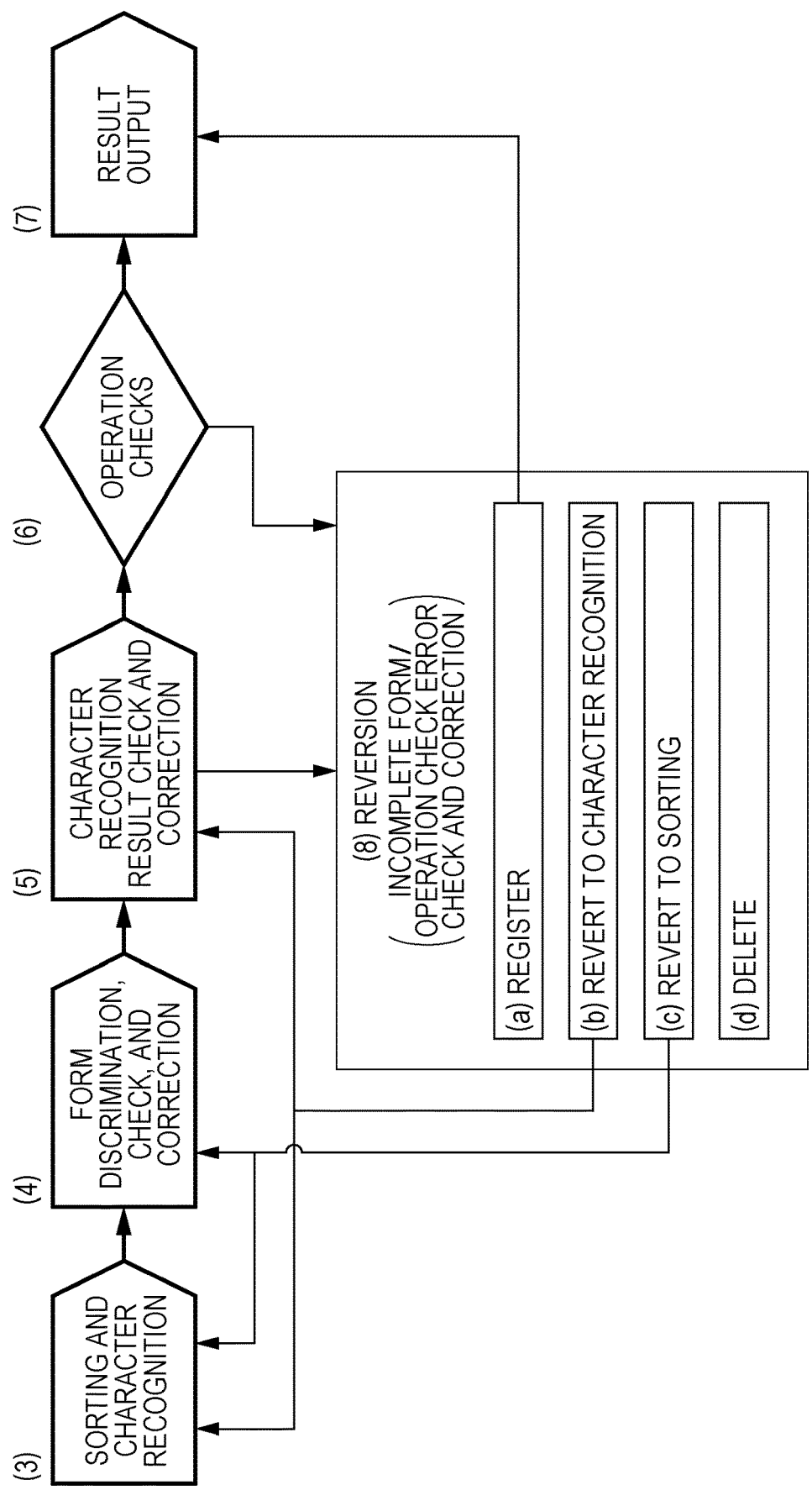
FIG. 5 is a diagram illustrating reversion according to the exemplary embodiment.

FIG. 5 is a diagram illustrating the reversion according to the present exemplary embodiment.

As illustrated in FIG. 5, if the operator visually finds an error in form images in (5) character recognition result check and correction, for example, the process proceeds to (8) reversion. If an error is detected in form images in (6) operation checks, too, the process proceeds to (8) reversion.

In (8) reversion, four options, namely (a) register the incomplete form, (b) revert to the character recognition for the incomplete form, (c) revert to the sorting for the incomplete form, and (d) delete the incomplete form, are presented. In (a) register the incomplete form, for example, the incomplete form is registered as is, or the incomplete form is corrected and the process proceeds to (7) result output, which is a later step. In (b) revert to the character recognition for the incomplete form, the process can revert to (3) sorting and character recognition or (5) character recognition result check and correction. In (c) revert to the sorting for the incomplete form, the process can revert to (3) sorting and character recognition or (4) form discrimination, check, and correction. In (d) delete the incomplete form, the process ends without performing any operation for the error.

Although a case where the four options, namely (a) register the incomplete form, (b) revert to the character recognition for the incomplete form, (c) revert to the sorting for the incomplete form, and (d) delete the incomplete form, are presented has been described, the options used are not limited to these. The options may be only (b) revert to the character recognition for the incomplete form and (c) revert to the sorting for the incomplete form, instead. The options may be only (a) register the incomplete form, (b) revert to the character recognition for the incomplete form, and (c) revert to the sorting for the incomplete form or only (b) revert to the character recognition for the incomplete form, (c) revert to the sorting for the incomplete form, and (d) delete the incomplete form, instead.

In addition to the four options (a) to (d), another option "conduct the operation checks again", which indicates that (6) operation checks are to be conducted again, may also be used.

Next, the operation of the information processing apparatus 20 according to the present exemplary embodiment will be described with reference to FIG. 6.

Figure 6:
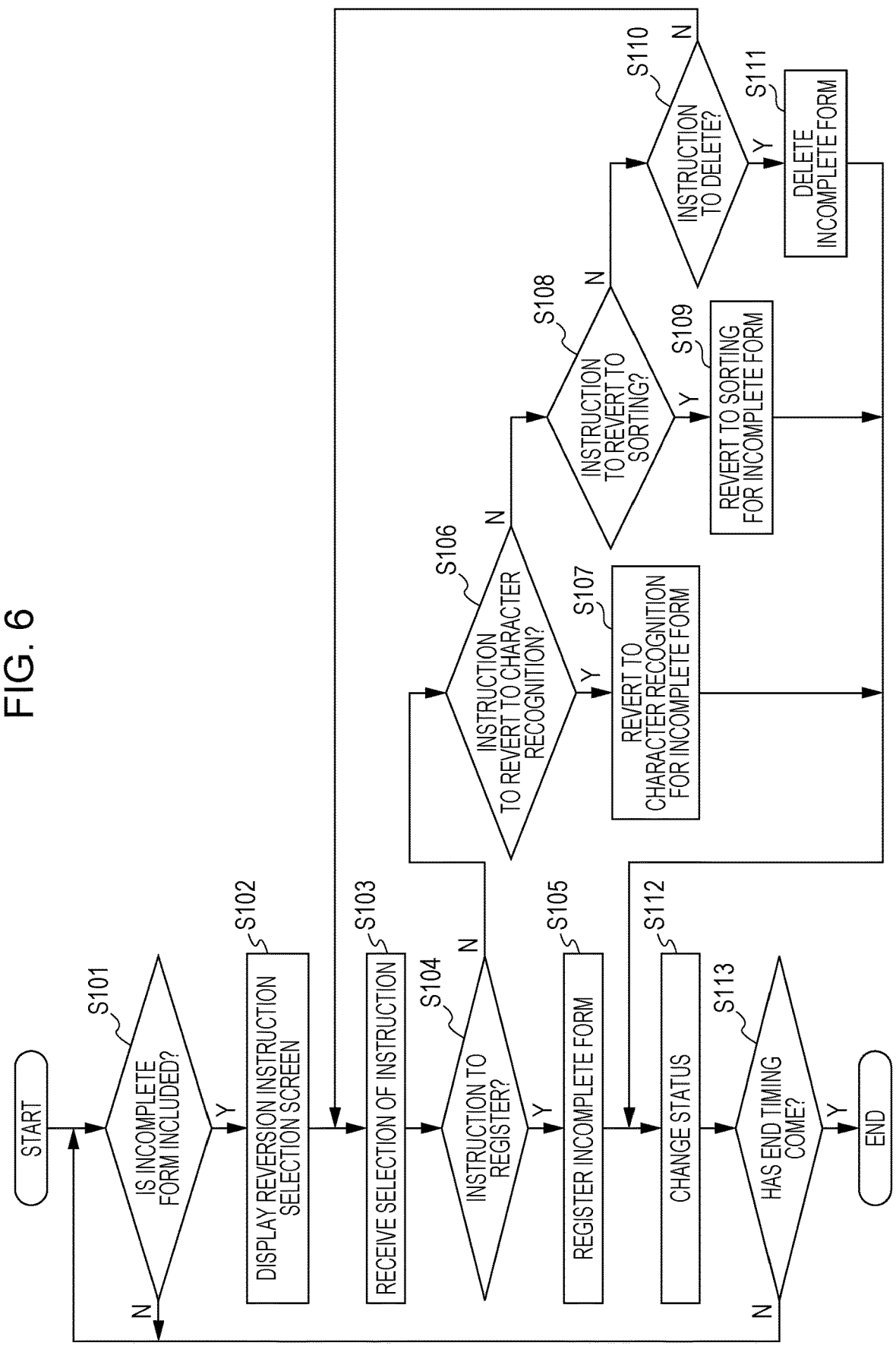
FIG. 6 is a flowchart illustrating an example of a process achieved by an information processing program according to the exemplary embodiment.

FIG. 6 is a flowchart illustrating an example of a process achieved by the information processing program 25A according to the present exemplary embodiment.

First, the information processing apparatus 20 is instructed to perform a form operation, and the CPU 21 activates the information processing program 25A to perform the following steps.

In step S101 illustrated in FIG. 6, the CPU 21 determines whether input form images include an incomplete form. If the CPU 21 determines that the input form images include an incomplete form (Y in step S101), the process proceeds to step S102. If the CPU 21 determines that the input form images do not include an incomplete form (N in step S101), the process remains at step S101. As described above, an incomplete form may be visually found by the manager or an operator or automatically detected in (6) operation checks.

In step S102, the CPU 21 displays the reversion instruction selection screen illustrated in FIGS. 7 to 10, for example, on the client terminal 40 used by the manager.

In step S103, the CPU 21 receives selection of one of the instructions, namely (a) register the incomplete form, (b)

revert to the character recognition for the incomplete form, (c) revert to the sorting for the incomplete form, and (d) delete the incomplete form, through the reversion instruction selection screen displayed on the client terminal 40 used by the manager.

In step S104, the CPU 21 determines whether the instruction selected in step S103 is (a) register the incomplete form. If the CPU 21 determines that the instruction is (a) register the incomplete form (Y in step S104), the process proceeds to step S105. If the CPU 21 determines that the instruction is not (a) register the incomplete form (N in step S104), the process proceeds to step S106.

Figure 7:
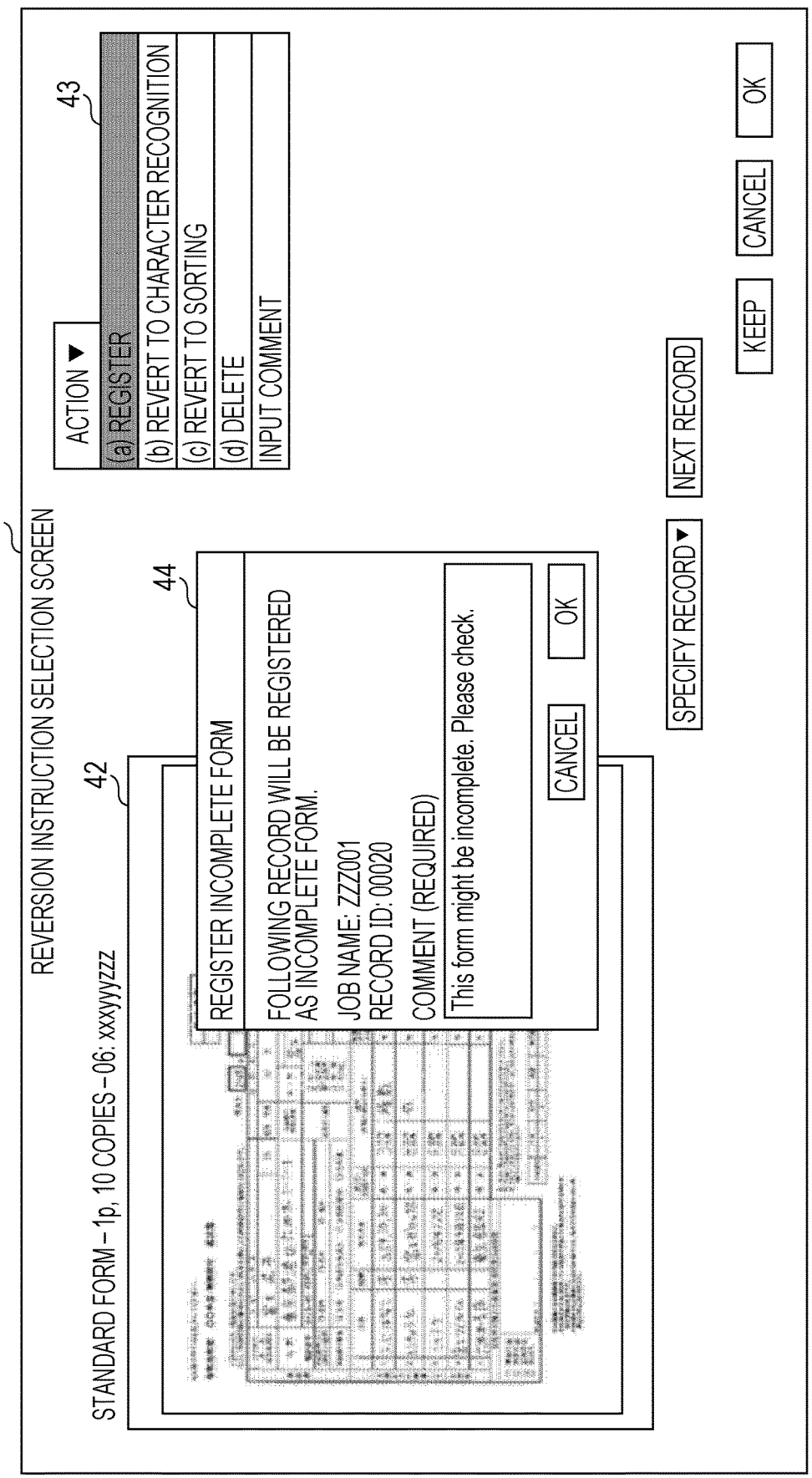
FIG. 7 is a diagram illustrating an example of a reversion instruction selection screen according to the exemplary embodiment.

FIG. 7 is a diagram illustrating an example of a reversion instruction selection screen 41 according to the present exemplary embodiment.

The reversion instruction selection screen 41 illustrated in FIG. 7 is displayed on the client terminal 40 used by the manager. In the reversion instruction selection screen 41, an incomplete form 42 for which the process is to revert and a reversion menu 43 are displayed. In the example illustrated in FIG. 7, (a) register the incomplete form has been selected (a background color thereof has changed) in the reversion menu 43. When (a) register the incomplete form is selected, a dialog box 44 is displayed. The dialog box 44 includes, for example, a message, "Following record will be registered as incomplete form", a job name, a record identifier (ID), and a comment. The manager inputs a comment such as "This form might be incomplete. Please check".

In step S105, if an OK button is selected in the dialog box 44 of the reversion instruction selection screen 41 illustrated in FIG. 7, for example, the CPU 21 confirms the selection of the instruction (a) register the incomplete form, and the process proceeds to step S112.

In step S106, on the other hand, the CPU 21 determines whether the instruction selected in step S103 is (b) revert to the character recognition for the incomplete form. If the CPU 21 determines that the instruction selected in step S106 is (b) revert to the character recognition for the incomplete form (Y in step S106), the process proceeds to step S107. If the CPU 21 determines that the instruction selected in step S106 is not (b) revert to the character recognition for the incomplete form (N in step S106), the process proceeds to step S108.

FIG. 8 is a diagram illustrating another example of the reversion instruction selection screen 41 according to the present exemplary embodiment.

As with the reversion instruction selection screen 41 illustrated in FIG. 7, the reversion instruction selection screen 41 illustrated in FIG. 8 is displayed on the client terminal 40 used by the manager. In the reversion instruction selection screen 41, the incomplete form 42 for which the process is to revert and the reversion menu 43 are displayed. In the example illustrated in FIG. 8, (b) revert to the character recognition for the incomplete form has been selected (a background color thereof has changed) in the reversion menu 43. When (b) revert to the character recognition for the incomplete form is selected, a dialog box 45 is displayed. The dialog box 45 includes, for example, a message, "Process will revert since following record is incomplete form", a job name, a record ID, and a comment. The manager inputs a comment such as "I've checked the record. The form is incomplete because a future application date is used. The process will revert".

In step S107, if an OK button is selected in the dialog box 45 of the reversion instruction selection screen 41 illustrated in FIG. 8, for example, the CPU 21 confirms the selection of the instruction (b) revert to the character recognition for the incomplete form, and the process proceeds to step S112.

In step S108, on the other hand, the CPU 21 determines whether the instruction selected in step S103 is (c) revert to the sorting for the incomplete form. If the CPU 21 determines that the instruction selected in step S103 is (c) revert to the sorting for the incomplete form (Y in step S108), the process proceeds to step S109. If the CPU 21 determines that the instruction selected in step S103 is not (c) revert to the sorting for the incomplete form (N in step S108), the process proceeds to step S110.

FIG. 9 is a diagram illustrating yet another example of the reversion instruction selection screen 41 according to the present exemplary embodiment.

As with the reversion instruction selection screens 41 illustrated in FIGS. 7 and 8, the reversion instruction selection screen 41 illustrated in FIG. 9 is displayed on the client terminal 40 used by the manager. In the reversion instruction selection screen 41, the incomplete form 42 for which the process is to revert and the reversion menu 43 are displayed. In the example illustrated in FIG. 9, (c) revert to the sorting for the incomplete form has been selected (a background color thereof has changed) in the reversion menu 43. When (c) revert to the sorting for the incomplete form is selected, a dialog box 46 is displayed. The dialog box 46 includes, for example, a message, "Process will revert for job including following record", a job name, a record ID, and a comment. The manager inputs a comment such as "This form might be incomplete. Please check".

In step S109, if an OK button is selected in the dialog box 46 of the reversion instruction selection screen 41 illustrated in FIG. 9, for example, the CPU 21 confirms the selection of the instruction (c) revert to the sorting for the incomplete form, and the process proceeds to step S112.

In step S110, on the other hand, the CPU 21 determines whether the instruction selected in step S103 is (d) delete the incomplete form. If the CPU 21 determines that the instruction selected in step S103 is (d) delete the incomplete form (Y in step S110), the process proceeds to step S111. If the CPU 21 determines that the instruction selected in step S103 is not (d) delete the incomplete form (N in step S110), the process returns to step S103 and waits until an instruction is selected.

Figure 10:
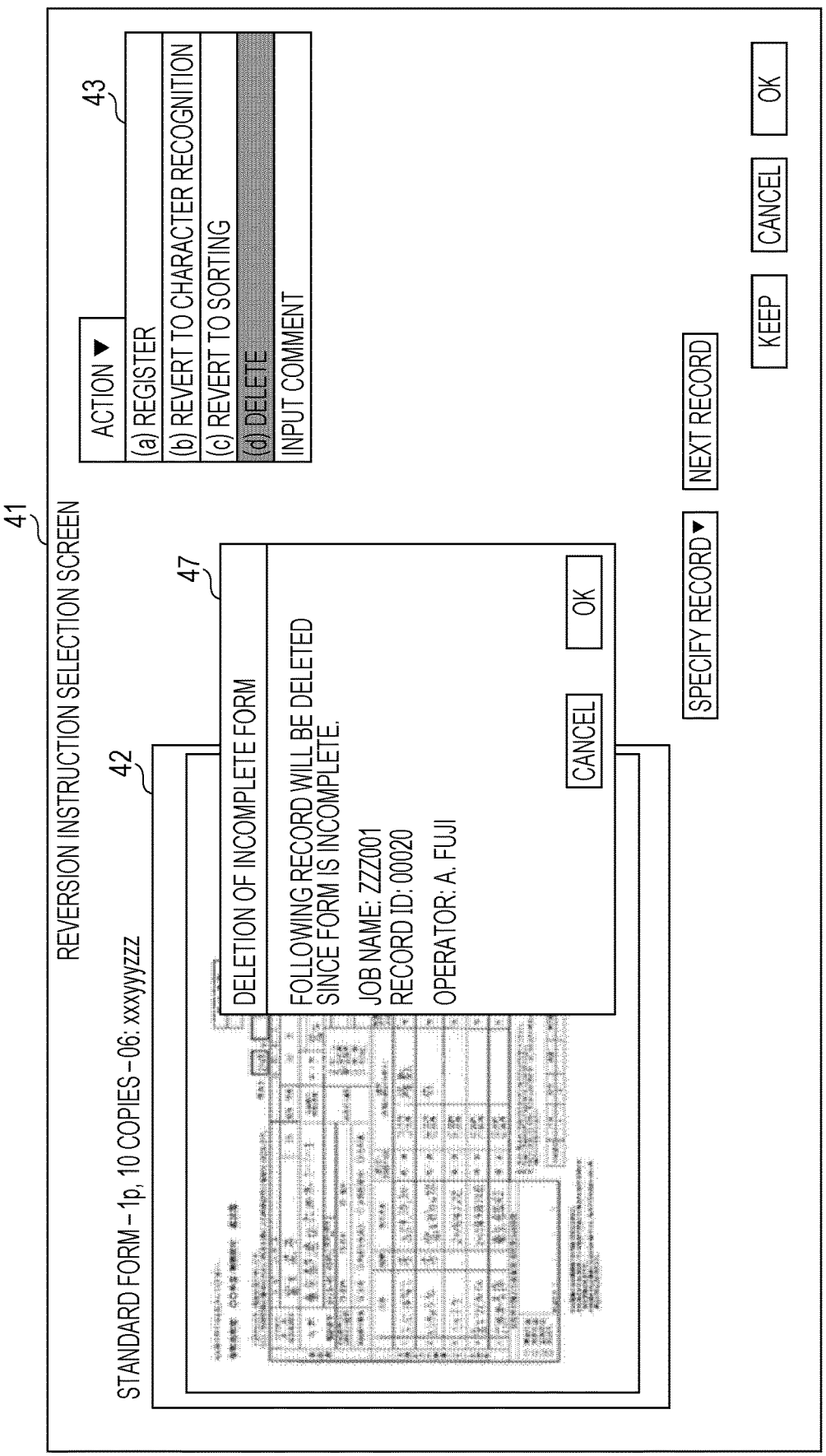
FIG. 10 is a diagram illustrating yet another example of the reversion instruction selection screen according to the exemplary embodiment.

FIG. 10 is a diagram illustrating yet another example of the reversion instruction selection screen 41 according to the present exemplary embodiment.

As with the reversion instruction selection screens 41 illustrated in FIGS. 7 to 9, the reversion instruction selection screen 41 illustrated in FIG. 10 is displayed on the client terminal 40 used by the manager. In the reversion instruction selection screen 41, the incomplete form 42 for which the process is to revert and the reversion menu 43 are displayed. In the example illustrated in FIG. 10, (d) delete the incomplete form has been selected (a background color thereof has changed) in the reversion menu 43. When (d) delete the incomplete form is selected, a dialog box 47 is displayed. The dialog box 47 includes, for example, a message, "Following record will be deleted since form is incomplete", a job name, a record ID, and a name of the operator.

In step S111, if an OK button is selected in the dialog box 47 of the reversion instruction selection screen 41 illustrated in FIG. 10, for example, the CPU 21 confirms the selection of the instruction (d) delete the incomplete form, and the process proceeds to step S112.

In step S112, the CPU 21 changes the status of the status management table 25B illustrated in FIG. 4 for a target job, for example, and the process proceeds to step S113. In the case of (b) revert to the character recognition for the incomplete form, for example, the status is changed in such a way as to indicate that the process has reverted to the character recognition. In the case of (c) revert to the sorting for the incomplete form, the status is changed in such a way as to indicate that the process has reverted to the sorting. The CPU 21 may notify the client terminal 40 used by the operator that the process has reverted to the character recognition or the sorting, for example, using an email or the like.

In step S113, the CPU 21 determines whether an end timing has come due to, for example, reception of an instruction to end the form operation. If the CPU 21 determines that the end timing has not come (N in step S113), the process returns to step S101 and starts again. If the CPU 21 determines that the end timing has come (Y in step S113), the process achieved by the information processing program 25A ends.

Next, an OCR check and correction screen according to the present exemplary embodiment will be specifically described with reference to FIGS. 11 and 12.

Figure 11:
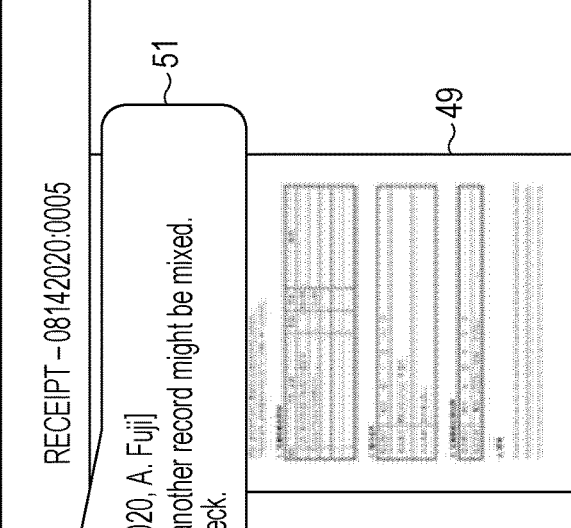
FIG. 11 is a diagram illustrating an example of an optical character recognition (OCR) check and correction screen according to the exemplary embodiment.

FIG. 11 is a diagram illustrating an example of an OCR check and correction screen 48 according to the present exemplary embodiment.

If an operator who checks and corrects a result of character recognition visually finds an error in the sorting in (5) character recognition result check and correction, the manager is notified of the error, and the OCR check and correction screen 48 illustrated in FIG. 11 is displayed on the client terminal 40 used by the manger. In the OCR check and correction screen 48, an incomplete form 49 for which the process is to revert, a result 50 of character recognition performed on the incomplete form 49, and an operator comment 51, which is a comment input by the operator, are displayed. The operator comment is, for example, "Pages of another record might be mixed. Please check".

FIG. 12 is a diagram illustrating another example of the OCR check and correction screen 48 according to the present exemplary embodiment.

If an error is found in a result of character recognition in (6) operation checks, the manager is notified of the error, and the OCR check and correction screen 48 illustrated in FIG. 12 is displayed on the client terminal 40 used by the manager. In the OCR check and correction screen 48, the incomplete form 49 for which the process is to revert and a result 52 of character recognition in which the error has been found in (6) operation checks are displayed.

According to the present exemplary embodiment, if there is an error in sorting of form images after the operator checks and corrects a result of character recognition, an instruction to cause a process to revert to the sorting for the form images is received. Input form images, therefore, need not be deleted and forms need not be read again, thereby reducing operation time.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

An information processing apparatus according to an exemplary embodiment has been described. A program for causing a computer to achieve the functions of the components of the information processing apparatus may be used to implement the exemplary embodiment, instead. A non-transitory computer readable medium storing the program may be used to implement the exemplary embodiment, instead.

The configuration of the information processing apparatus described in the exemplary embodiment is an example and may be modified depending on a situation insofar as the spirit of the present disclosure is not deviated from.

The process achieved by the program described in the above exemplary embodiment is also an example, and some steps deemed unnecessary may be omitted, new steps may be added, or order of steps may be changed, insofar as the scope of the present disclosure is not deviated from.

Although a case where the process according to the exemplary embodiment is achieved by a software configuration using a computer that executes the programs has been described in the exemplary embodiment, a method for achieving the process according to the exemplary embodiment is not limited to this. For example, the exemplary embodiment may be achieved by a hardware configuration or a combination of a hardware configuration and a software configuration, instead.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
   perform sorting of a form image inputted to the information processing apparatus;
   based on a result of the sorting, perform a character recognition on the form image;
   display a result of the character recognition of the form image for check and correction;
   receive an indication that an error is detected on the result of the character recognition of the form image; and
   upon receiving the indication that the error is detected on the result of the character recognition of the form image, display a reversion screen that includes, for selection, at least a first option to revert to the sorting of the form image and separately a second option to revert to the character recognition of the form image; and
a memory storing a status management table for display on an operator's terminal, the status management table managing a status indicating progress of a form operation relating to the form image,
wherein the processor is configured to change, upon receiving the selection of the first option on the reversion screen to revert to the sorting, the status of the status management table in such a way as to indicate that the form operation of the form image has reverted to the sorting.

2. The information processing apparatus according to claim 1, wherein the reversion screen further includes, for selection, a third option to register or delete the form image.

3. The information processing apparatus according to claim 1, wherein the reversion screen further includes, for selection, a third option to register the form image, and separately a fourth option to delete the form image.

4. The information processing apparatus according to claim 1,
wherein the processor is configured to receive, if an error is found in the result of the character recognition performed on the form image after a user checks and corrects the result of the character recognition, an instruction to cause the process to revert to the character recognition for the form image.

5. The information processing apparatus according to claim 2,
wherein the processor is configured to receive, if an error is found in the result of the character recognition performed on the form image after a user checks and corrects the result of the character recognition, an instruction to cause the process to revert to the character recognition for the form image.

6. The information processing apparatus according to claim 3,
wherein the processor is configured to receive, if an error is found in the result of the character recognition performed on the form image after a user checks and corrects the result of the character recognition, an instruction to cause the process to revert to the character recognition for the form image.

7. The information processing apparatus according to claim 1,
wherein the processor is configured to notify, upon receiving the selection of the first option on the reversion screen as an instruction to cause the process to revert to the sorting of the form image, an operator who performs the sorting that the process has reverted to the sorting.

8. The information processing apparatus according to claim 2,
wherein the processor is configured to notify, upon receiving the selection of the first option on the reversion screen as an instruction to cause the process to revert to the sorting of the form image, an operator who performs the sorting that the process has reverted to the sorting.

9. The information processing apparatus according to claim 3,
wherein the processor is configured to notify, upon receiving the selection of the first option on the reversion screen as an instruction to cause the process to revert to the sorting of the form image, an operator who performs the sorting that the process has reverted to the sorting.

10. The information processing apparatus according to claim 4,
wherein the processor is configured to notify, upon receiving the selection of the first option on the reversion screen as an instruction to cause the process to revert to the sorting of the form image, an operator who performs the sorting that the process has reverted to the sorting.

11. A non-transitory computer readable medium storing a program causing a computer to execute a process for processing information, the process comprising:
performing sorting of a form image inputted to an information processing apparatus including the computer;
based on a result of the sorting, performing a character recognition on the form image;
displaying a result of the character recognition of the form image for check and correction;
receiving an indication that an error is detected on the result of the character recognition of the form image; and
upon receiving the indication that the error is detected on the result of the character recognition of the form image, displaying a reversion screen that includes, for selection, at least a first option to revert to the sorting of the form image and separately a second option to revert to the character recognition of the form image, wherein:
a memory stores a status management table for display on an operator's terminal, the status management table managing a status indicating progress of a form operation relating to the form image, and
the process further comprises changing, upon receiving the selection of the first option on the reversion screen to revert to the sorting, the status of the status management table in such a way as to indicate that the form operation of the form image has reverted to the sorting.

* * * * *